United States Patent [19]
Pritchard et al.

[11] Patent Number: 4,535,260
[45] Date of Patent: Aug. 13, 1985

[54] MAGNETIC LINEAR MOTOR

[75] Inventors: Robert J. Pritchard, Lansdale; Kevin Lindenmuth, Sellersville, both of Pa.

[73] Assignee: Teleflex Incorporated, Limerick, Pa.

[21] Appl. No.: 660,540

[22] Filed: Oct. 15, 1984

[51] Int. Cl.³ .............................................. H02K 41/00
[52] U.S. Cl. ........................................ 310/12; 318/135
[58] Field of Search ................................ 310/12–14; 318/135

[56] References Cited
U.S. PATENT DOCUMENTS

| Re. 27,436 | 7/1972 | Sawyer | 310/12 X |
|---|---|---|---|
| 3,265,911 | 8/1966 | Madsen | 310/12 |
| 3,273,727 | 9/1966 | Rogers et al. | 310/13 X |
| 3,357,511 | 12/1967 | Mackie | 310/13 X |
| 3,376,578 | 4/1968 | Sawyer | 318/135 X |
| 3,457,482 | 7/1969 | Sawyer | 310/13 X |
| 3,656,014 | 4/1972 | Rich | 310/13 |
| 3,668,443 | 6/1972 | Schwartz | 310/12 |
| 3,735,231 | 5/1973 | Sawyer | 310/12 X |

Primary Examiner—Donovan F. Duggan
Attorney, Agent, or Firm—Harold W. Milton, Jr.

[57] ABSTRACT

A magnetic linear motor is movable over a planar surface defined by laminations of alternately magnetic and nonmagnetic materials in the direction of movement of a head disposed thereover. The head includes four pluralities of laminations paired by a winding extending therethrough with laminations of each pair aligned transversely and the two pairs of laminations being offset whereby when one pair of laminations is aligned with the laminations in the reactive platen surface, the other pair of laminations overlap magnetic and nonmagnetic laminations. The laminations extend perpendicularly to the direction of travel and each have two legs, one shorter than the other, so that magnetic coupling occurs between each pair of grouped laminations transversely along the magnetic laminations in the platen with the energization of the winding associated therewith determining the direction of movement.

9 Claims, 7 Drawing Figures

MAGNETIC LINEAR MOTOR

TECHNICAL FIELD

The subject invention relates to a magnetic linear motor assembly of the type having a head movable over a planar platen surface as a result of magnetic coupling between the head and the platen surface.

BACKGROUND OF THE INVENTION

The head of linear magnetic motors typically include a plurality of pole pieces each presenting a plurality of teeth each extending transversely to the direction of movement of the head over a planar surface. The planar surface presents teeth which are spaced from one another in the direction of movement to magnetically coact with the teeth presented in the poles of the motor by lines of magnetic flux passing into one tooth in the platen and moving through the platen in the direction of movement of the head and out another axially spaced tooth to coact with another tooth in the head. In other words, the adjacent teeth in the platen spaced from one another in the direction of movement of the head disposed thereover must be magnetically coupled. The poles of the head disposed over the platen typically include laminations extending in the direction of movement and presenting the downwardly projecting teeth spaced therealong in the direction of movement of the head. These laminations must be precisely fabricated to provide accurate dimensional control of the width of the teeth in the direction of movement. Typical of such a linear motor assembly is that shown in U.S. Pat. No. Re. 27,289 granted Feb. 15, 1972 to Bruce A. Sawyer. Laminations running perpendicular to the direction of movement in a linear mode motor have been disclosed but in a cylindrical configuration, as shown in U.S. Pat. No. 4,335,338 granted June 15, 1982 to Bruce A. Sawyer.

SUMMARY OF INVENTION AND ADVANTAGES

A magnetic linear motor assembly (10) comprising; a platen defining a planar surface presenting a grid of magnetic (12) and nonmagnetic (14) zones spaced from one another along an axis (A) of relative movement a distance pn where n is any whole number and p is the pitch of the grid as defined by the distance between center lines of next adjacent magnetic zones (12) or of next adjacent nonmagnetic zones (14). A head (22) is movable along the axis (A) over the platen and includes a first plurality (24) of U-shaped laminations extending transversely to the said axis (A) and disposed on adjacent centerlines spaced $p(n\pm\frac{1}{2})$ apart with the lower extremity of one leg (26, 28') of each lamination being shorter than the other long leg (26', 28) so as to be spaced farther above said magnetic zones (12) of the platen and with each short leg (26, 28') being sandwiched between the axially aligned long legs (26, 28') of the next adjacent laminations so that the first legs (26, 26') of the laminations are alternately short and long and the second legs (28, 28') of the laminations are alternately short and long. The head also includes a second plurality (30) of U-shaped laminations, a third plurality (32) of laminations and a fourth plurality (34) of laminations, all identical to the first plurality (24). The laminations of the first plurality (24) are transversely aligned with the laminations (26, 26') of the second plurality (30) and with the first (26, 26') and second (28, 28') legs thereof being alternately short and long across aligned laminations of the first and second pluralities (24, 30) aligned transversely of the axis (A) of movement. The laminations of the third plurality (32) are in similar fashion transversely aligned with the laminations of the fourth plurality (34) and with the first (26, 26') and second (28, 28') legs thereof being alternately short and long across aligned laminations of the third (32) and fourth (34) pluralities aligned transversely of the axis (A) of movement. A first bias magnet means (36) establishes magnetic flux for polarizing the first (26, 26') and second (28, 28') legs of the first plurality (24) of laminations (26, 26') in opposite polarity to the first (26, 26') and second (28, 28') legs of second plurality (30) of laminations. A second bias magnet means (36') establishes magnetic flux for polarizing the first (26, 26') and second (28, 28') legs of the third plurality (32) of laminations in opposite polarity to the first (26, 26') and second (28, 28') legs of the fourth plurality (34) of laminations. A first winding means (38) looped between the first (26, 26') and second (28, 28') legs of the first plurality (24) of laminations for reinforcing the flux in axially aligned first legs (26, 26') while opposing the flux in the other axially aligned second legs (28, 28') of the first plurality (24) of laminations and looped between the first (26, 26') and second (28, 28') legs of the second plurality (30) of laminations for reinforcing the flux in the axially aligned first legs (26, 26') while opposing the flux in the other axially aligned second legs (28, 28') of the second plurality (30) of laminations, and vice versa, depending upon the direction of electrical current flow in the first winding means (38). A second winding means (40) is similarly looped between the first (26, 26') and second (28, 28') legs of the third (32) and fourth (34) pluralities of laminations. Thus, when the first (24) and second (30) plurality of laminations are axially aligned with and transversely overlying the magnetic zones (12) and the third (32) and fourth (34) plurality of laminations are axially offset $p(n\pm\frac{1}{4})$ and transversely overlapping the magnetic (12) and nonmagnetic (14) zones, the long legs (28) of the second legs (28, 28') of each of the third (32) and fourth (34) plurality of laminations coact with the underlying magnetic zones (12) in response to current flow in the second winding means (40) in loop direction one (clockwise) to move the head (22) axially in one direction and the long legs (26') of the first legs (26, 26') of each of the third (32) and fourth (34) plurality of laminations coact with the underlying magnetic zones (12) in response to current flow in the second winding means (40) in loop direction two (counterclockwise) opposite to direction one to move the head (22) axially in the opposite direction at which position current flow in the first winding means (38) in loop direction one causes the long legs (26') of first legs (26, 26') of each of the first (24) and second (30) plurality of laminations to coact with the underlying magnetic zones (12) to move the head (22) axially in one direction or alternatively current flow in the first winding means (18) in loop direction two opposite to direction one causes the long legs (28) of the second legs (28, 28') of each of first (24) and second (30) plurality of laminations to coact with the underlying magnetic zones (12) to move head (22) axially in the opposite direction.

A planar linear motor constructed in accordance with the subject invention allows each tooth to be defined by a lamination running perpendicular to motor movement and parallel to the tooth or pole faces which minimizes eddy currents. Accordingly, tooth pitch is a function of lamination thickness and therefore eliminates the punching or machining of a particular pitch design requiring dimensional control of tooth width. The material which is returning the flux may be thinner since the flux will be travelling along the tooth transversely to the direction of movement and not under it and perpendicular to the tooth and parallel to the direction of movement. In other words, teeth of the platen need not be magnetically interconnected in the direction of movement and thus may be fabricated of alternating laminations of magnetic and nonmagnetic materials.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
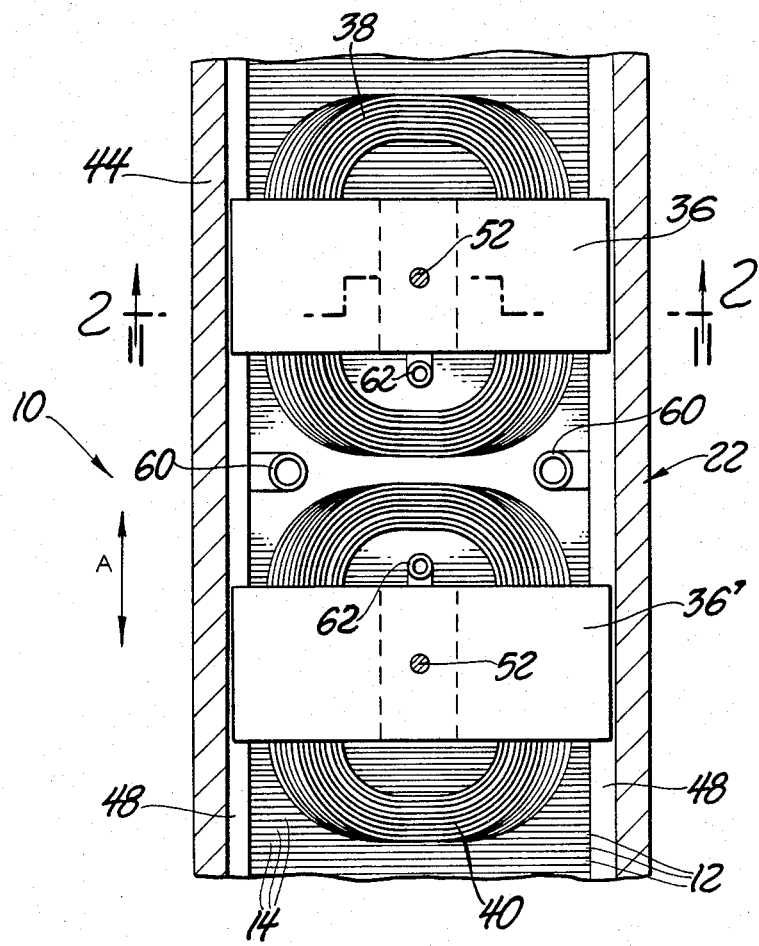
FIG. 1 is a cross-sectional view taken substantially along line 1—1 of FIG. 2 showing a preferred embodiment of the subject invention but without the side bars shown in FIG. 2.
Figure 2:
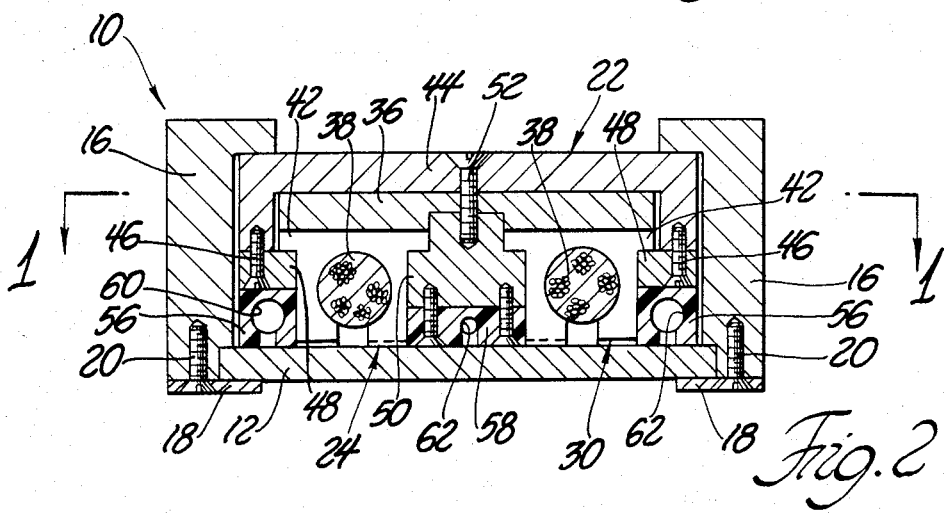
FIG. 2 is an elevational cross-sectional view taken substantially along line 2—2 of FIG. 1 but including the side bars.

A magnetic linear motor assembly constructed in accordance with the subject invention is generally shown at 10 in FIGS. 1 and 2.

The assembly 10 includes a platen defining a planar surface presenting a grid of metallic and nonmetallic zones or laminations 12 and 14. The laminations 12 and 14 are spaced from one another along an axis A, as shown in FIG. 1. The axis A is the axis of relative movement established in the linear motor assembly 10. The laminations 12 are made of a magnetic material and are spaced a distance pn along the axis A where n is any whole number and p is the pitch of the grid as defined by the distance between centerlines of next adjacent magnetic zone or laminations 12 or, in a similar fashion, the distance between next adjacent nonmagnetic zones 14, the nonmagnetic zones 14 being defined by laminations of nonmagnetic material such as plastic.

The laminations 12 and 14 extend between a pair of housing side bars 16 and are held thereto by clamping strips 18 secured in place by the fasteners or screws 20.

A head generally indicated at 22 is moveable along the axis A over the platen defined by the laminations 12 and 14 and the side bars 16. The side bars 16 define a track and may be connected together by any number of cross beams above or below.

The head 22 includes a first plurality 24 of U-shaped laminations extending transversely to the axis A and disposed on adjacent centerlines spaced apart $p(n \pm \frac{1}{2})$. As shown, the laminations are of equal thicknesses the same as the laminations 12 and 14 in the platen and are therefore one-half the pitch of the grid, i.e., $\frac{1}{2}$ p. The lower extremity 26 of one leg of each lamination is shorter than the other long leg 28 thereof so as to be spaced farther above the tops of the magnetic laminations 12 of the platen. Each short leg 26 is sandwiched between axially aligned long legs 26' of the next adjacent laminations so that the first legs 26 and 26' of the laminations are alternately short 26 and long 26' and the second legs 28' and 28 of the laminations are alternately short 28' and long 28.

In the exact same fashion, the head 22 includes an identical second plurality of U-shaped laminations 30 extending transversely to the axis A and disposed on adjacent centerlines spaced $p(n \pm \frac{1}{2})$ apart with the lower extremity of one leg of each lamination being shorter than the other long leg thereof so as to be spaced farther above the magnetic laminations 12 of the platen. Similarly, each short leg 26 is sandwiched between the axially aligned long legs 26' of the next adjacent laminations so that the first legs 26 and 26' of the second plurality of laminations 30 are alternately short and long as are the second legs 28 and 28' thereof.

The laminations of the first plurality 24 are transversely aligned with the laminations of the second plurality 30 and with the first and second legs thereof being alternately short and long in the direction across aligned laminations of the first and second pluralities 24 and 30. As viewed in FIG. 4, the first lamination has a short leg 26 followed by a long leg 28 transversely across or parallel to the magnetic laminations 12 of the platen followed by a next short leg 26 in the aligned lamination in the plurality 30 followed by then a long leg 28.

In a similar fashion, the head 22 includes an identical third plurality 32 of U-shaped laminations identical to the previous laminations and extending transversely to the axis A and disposed on adjacent centerlines spaced $p(n \pm \frac{1}{2})$ apart with the lower extremity of one leg of each lamination being shorter than the other long leg thereof so as to be spaced farther above the magnetic laminations 12 of the platen and with each short leg being sandwiched between the axially aligned long legs of the next adjacent laminations so that the first legs of the third plurality 32 of laminations are alternately short and long as are the second legs thereof.

Likewise, the head 22 includes an identical fourth plurality 34 of U-shaped laminations extending transversely to the axis A and disposed on adjacent centerlines spaced $p(n \pm \frac{1}{2})$ apart with the lower extremity of one leg of each lamination being shorter than the other long leg thereof so as to be spaced farther above the magnetic zones 12 of the platen and with each short leg being sandwiched between the axially aligned long legs of the next adjacent laminations so that the first legs of the fourth plurality 34 of laminations are alternately short and long as are the second legs thereof.

In a fashion similar to the first and second pluralities 24 and 30 of laminations, the third and fourth pluralities 32 and 34 are transversely aligned and the first and second legs thereof are alternately short and long across the aligned laminations of the third and fourth pluralities.

Figure 3:
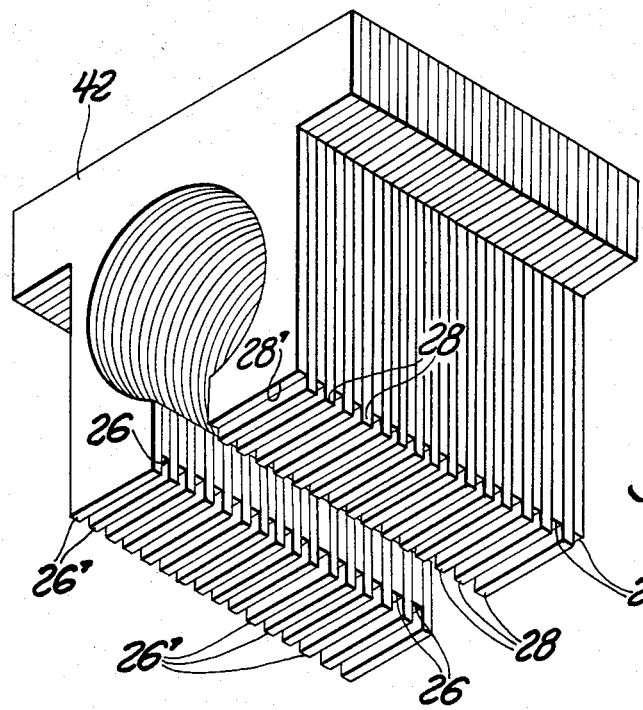
FIG. 3 is a perspective view of a plurality of laminations constructed in accordance with the subject invention.

Accordingly, the plurality of laminations shown in FIG. 3 is identical to the same as each plurality 24, 30, 32 and 34 of laminations utilized in the subject invention.

Figure 5:
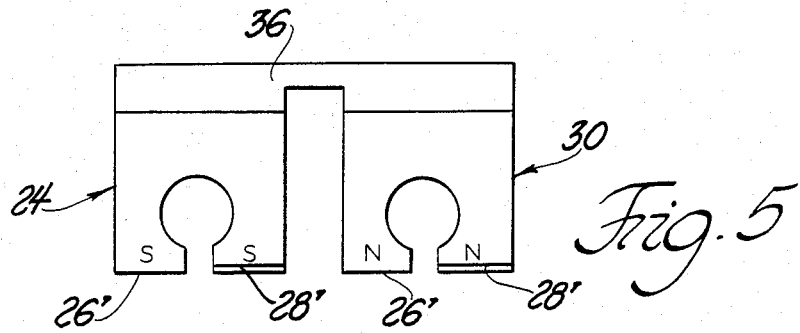
FIG. 5 shows a pair of pluralities of laminations polarized by a permanent magnet.

The head 22 includes a first bias or permanent magnet 36 establishing magnetic flux for polarizing the first and second legs of the first plurality of laminations 24 in opposite polarity to the first and second legs of the second plurality of laminations 30. This is illustrated schematically in FIG. 5 wherein the permanent magnet 36 establishes a south (S) polarity of the legs 26, 26' and 28 and 28' of the first plurality 24 of laminations and a north (N) polarity of the legs 26, 26', 28 and 28' of the second plurality 30 of laminations. Although not visible, a second bias permanent magnet establishes a similar magnetic flux for polarizing the first and second legs of the third plurality of laminations 32 in opposite polarity to the first and second legs of the fourth plurality 34 of laminations.

Figure 6:
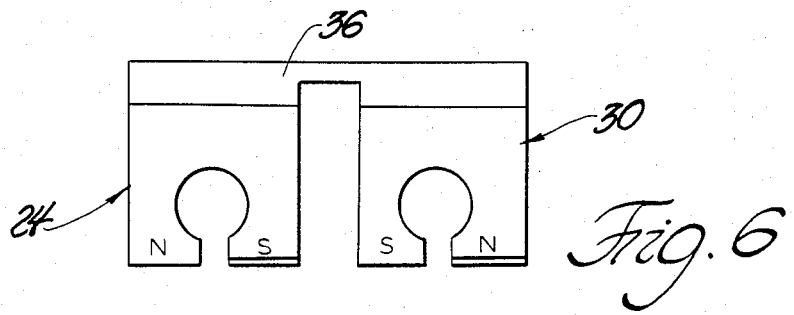
FIG. 6 shows the pair of pluralities of laminations and the resulting polarities established therein by a winding associated therewith.

A first winding 38 is looped between the first 26 and 26' and second 28 and 28' legs of the first plurality 24 of laminations for reinforcing the flux in the axially aligned first legs 26 and 26' while opposing the flux in the other axially aligned second legs 28 and 28' of the first plurality of laminations 24. The winding 38 is similarly looped between the first 26 and 26' and second 28 and 28' legs of the second plurality of laminations 30 for reinforcing the flux in the axially aligned first legs 26 and 26' while opposing the flux in the other axially aligned second legs 28 and 28' of the second plurality of laminations 30 and vice versa, depending upon the direction of electrical current flow in the winding 38. The polarization created by the winding 38 alone is shown in FIG. 6 wherein the first legs 26 and 26' of the first plurality of laminations 24 have a north (N) polarity whereas the second legs 28 and 28' of the same U-shaped laminations have a south (S) polarity. However, the winding 38 imposes a magnetic flux upon the second plurality 30 of laminations so that the first legs 26 and 26' thereof have a south (S) polarity and the other second legs 28 and 28' thereof have a north (N) polarity.

Figure 7:
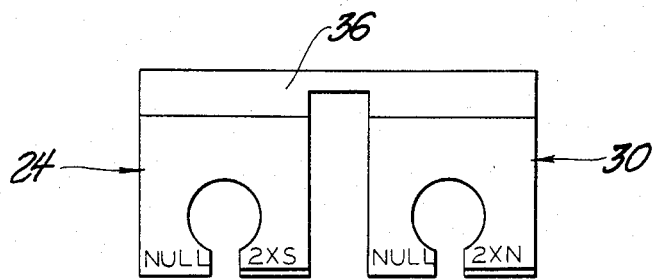
FIG. 7 is the resulting polarity of the laminations after combining the effects of the permanent magnet and the windings.

FIG. 7 illustrates schematically the resultant polarity of the legs by adding the bias permanent magnet effect to the effect of the winding 38 so that the first legs 26 and 26' of the first plurality 24 of laminations are null as the two fluxes oppose one another whereas the second legs 28 and 28' thereof have a south (S) polarity resulting from the combination of the two fluxes reinforcing one another with the first legs of the second plurality 30 of laminations also being nulled or at a zero and the second legs thereof being of a north (N) polarity. Consequently, the lines of magnetic force will flow between the north and south poles of the respective two pluralities of laminations through the transversely extending magnetic laminations 12 in the platen.

Figure 4:
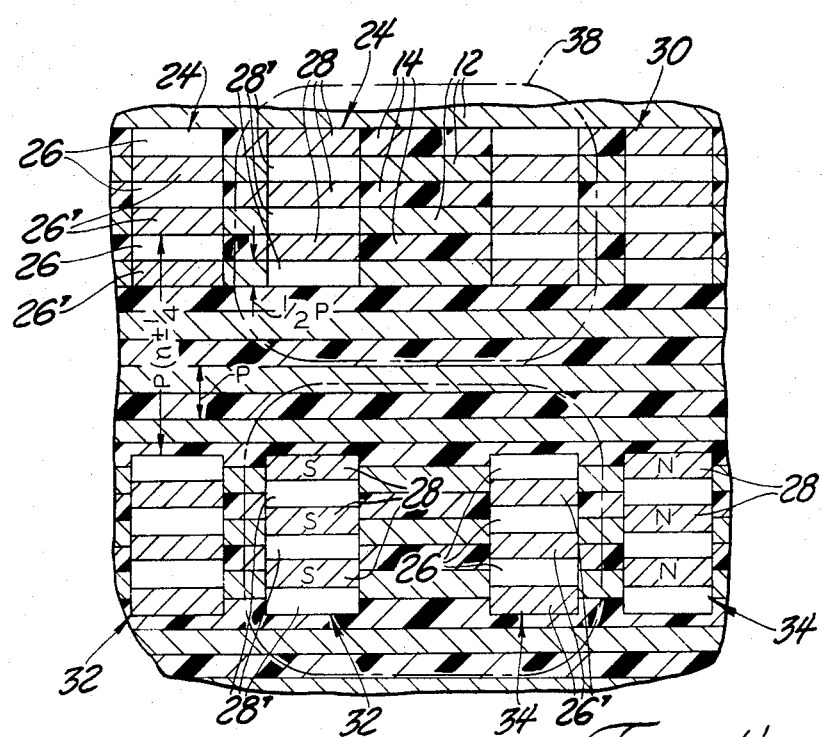
FIG. 4 is a schematic view showing the four pluralities of laminations in a head assembly constructed in accordance with the subject invention.

In a similar fashion, a second winding 40 is looped between the first and second legs of the third plurality 32 of laminations for reinforcing the flux in axially aligned first legs while opposing the flux in the other axially aligned second legs of the third plurality 32 of laminations and while also being looped between the first and second legs of the fourth plurality of laminations 34 for reinforcing the flux in the axially aligned first legs while opposing the flux in the other axially aligned second legs and vice versa, depending upon the direction of electrical current flow in the second winding means 40. Accordingly, when, as illustrated in FIG. 4, the first and second plurality of laminations 24 and 30 are axially aligned with and transversely overlying the magnetic laminations 12 and the third and fourth pluralities 32 and 34 of laminations are axially offset $p(n\pm\frac{1}{4})$ from the underlying magnetic zones and transversely overlapping the magnetic and nonmagnetic laminations 12 and 14, the long legs 28 of the second legs 28 and 28' of each of the third and fourth plurality 32 and 34 of laminations coact with the underlying magnetic laminations 12 in response to clockwise current flow in the second winding 40, i.e., loop direction one, to move the head 22 axially downward as viewed in FIG. 4. In other words, the polarized long legs react with the underlying magnetic laminations 12 with which they overlap to move to a completely overlapping or aligned position. On the other hand, if the current in the second winding 40 is in the counterclockwise direction, the long legs 26' of the first legs 26 and 26' of each of the third and fourth pluralities 32 and 34 of laminations coact with the underlying magnetic laminations 12 in response to current flow in the second winding 40 in the opposite loop direction or counterclockwise to move the head 22 axially in the opposite direction or upward as viewed in FIGS. 1 and 4. Once at this moved position, current flow in the first winding means 38 in loop direction one causes the long legs of the first legs of each of the first and second pluralities 24 and 30 of laminations to coact with the underlying magnetic laminations 12 to move the head 22 axially in one direction. Alternatively current flow in the first winding means 38 in the opposite loop direction causes the long legs of the second legs of each of the first and second pluralities 24 and 30 of laminations to coact with the underlying magnetic laminations 12 to move the head axially in the opposite direction.

Accordingly, as illustrated schematically in FIG. 4, electrical current in the first winding 38 will cause no movement of the head 22 because the teeth of the first and second pluralities 24 and 30 are already axially aligned and transversely coextensive with the underlying magnetic laminations 12. However, current in the second winding 40 in one direction will cause the long legs to the right of each plurality of laminations 32 and 34 to coact with the magnetic laminations 12 to move the head 22 downwardly whereas current in the second winding 40 in the opposite counterclockwise direction causes the long legs to the left of each of the pluralities 32 and 34 to coact with the underlying magnetic laminations 12 to move the head upwardly. Once so moved, the other winding 38 may be activated in either direction to move the head 22 in either axial direction.

As best shown in FIGS. 2 and 3, each of the laminations includes a T-shaped top 42 from which the first 26 and 26' legs and second 28 and 28' legs depend. The head 22 includes a housing means 44 connected by fasteners 46 to clamping members or strips 48 which engage the bottoms of the T-shaped tops 42 to clamp the laminations and the overlying magnets 36 and 36' to the bottom of the housing 44. Also included in the clamping means is the clamping strip 50 which also underlies the inner bottoms of the T-shaped tops 42 of the laminations and is secured to the housing 44 by screws 52 which also pass through the respective magnets 36 and 36'.

As alluded to above, the permanent magnet 36 extends between the tops 42 of the first and second pluralities 24 and 30 of laminations whereas the second permanent magnet 36' extends between the tops 42 of the third and fourth pluralities 32 and 34 of laminations.

The head 22 also includes the floatation or air dispensing strips 56 and 58 glued or secured by screws to the bottoms of the clamping members 48 and 50 for providing an air cushion between the bottom of the head 22 and the upper surfaces of the laminations 12 and 14 of the platen whereby the head 22 rides on an air cushion axially along the platen. The strips 56 and 58 may be supplied air through the passages 60 and 62 to provide a bed of air over which the head 22 floats.

As alluded to above, the laminations 12 and 14 of the platen are respectively independent of one another whereby each magnetic lamination 12 is independent magnetically of the next adjacent magnetic lamination 12 but the tops thereof provide a surface allowing a cushion of air to be established thereover.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A magnetic linear motor assembly (10) comprising; a platen defining a planar surface presenting a grid of magnetic (12) and nonmagnetic (14) zones spaced from one another along an axis (A) of relative movement a distance pn where n is any whole number and p is the pitch of the grid as defined by the distance between center lines of next adjacent magnetic zones (12) or of next adjacent nonmagnetic zones (14), a head (22) movable along said axis (A) over said platen, said head (22) including a first plurality (24) of U-shaped laminations extending transversely to said axis (A) and disposed on adjacent centerlines spaced $p(n\pm\frac{1}{2})$ apart with the lower extremity of one leg (26, 28') of each lamination being shorter than the other long leg (26', 28) so as to be spaced farther above said magnetic zones (12) of said platen and with each short leg (26, 28') being sandwiched between the axially aligned long legs (26', 28) of the next adjacent laminations so that the first legs (26, 26') of said laminations are alternately short and long and the second legs (28, 28') of said laminations are alternately short and long, said head including a second plurality (30) of U-shaped laminations extending transversely to said axis (A) of movement and disposed on adjacent centerlines spaced $p(n+\frac{1}{2})$ apart with the lower extremity of one leg (26, 28') of each lamination being shorter than the other long leg (26', 28) thereof so as to be spaced farther above said magnetic zones (12) of said platen and with each short leg (26, 28') being sandwiched between the axially aligned long legs (26', 28) of the next adjacent laminations so that the first legs (26, 26') of said second plurality of laminations (30) are alternately short and long as are the second legs (28, 28') thereof, said laminations of said first plurality (24) being transversely aligned with the laminations (26, 26') of said second plurality (30) and with said first (26, 26') and second (28, 28') legs thereof being alternately short and long across aligned laminations of said first and second pluralities (24, 30) aligned transversely of said axis (A) of movement, said head (22) including a third plurality (32) of U-shaped laminations extending transversely to said axis (A) of movement and disposed on adjacent centerlines spaced $p(n\pm\frac{1}{2})$ apart with the lower extremity of one leg (26, 28') of each lamination being shorter than the other long leg (26, 28') thereof so as to be spaced farther above said magnetic (26, 28') zones (12) of said platen and with each short leg (26, 28') being sandwiched between the axially aligned long legs (26', 28) of the next adjacent laminations to that the first legs (26, 26') of said third plurality (32) of laminations are alternately short and long as are the second legs (28, 28') thereof, said head (22) including a fourth plurality (34) of U-shaped laminations extending transversely to said axis (A) of movement and disposed on adjacent centerlines spaced $p(n\pm\frac{1}{2})$ apart with the lower extremity of one leg (26, 28') of each lamination being shorter than the other long leg (26', 28) thereof so as to be spaced farther above said magnetic zones (12) of said platen and with each short leg (26, 28') being sandwiched between the axially aligned long legs (26', 28) of the next adjacent laminations so that the first legs (26, 26') of said fourth plurality (34) of laminations are alternately short and long as are the second legs (28, 28') thereof, said laminations of said third plurality (32) being transversely aligned with the laminations of said fourth plurality (34) and with said first (26, 26') and second (28, 28') legs thereof being alternately short and long across aligned laminations of said third (32) and fourth (34) pluralities aligned transversely of said axis (A) of movement, first bias magnet means (36) establishing magnetic flux for polarizing said first (26, 26') and second (28, 28') legs of said first plurality (24) of laminations (26, 26') in opposite polarity to said first (26, 26') and second (28, 28') legs of said second plurality (30) of laminations, second bias magnet means (36') establishing magnetic flux for polarizing said first (26, 26') and second (28, 28') legs of said third plurality (32) of laminations in opposite polarity to said first (26, 26') and second (28, 28') legs of said fourth plurality (34) of laminations, first winding means (38) looped between the first (26, 26') and second (28, 28') legs of said first plurality (24) of laminations for reinforcing the flux in axially aligned first legs (26, 26') while opposing the flux in the other axially aligned second legs (28, 28') of said first plurality (24) of laminations and looped between the first (26, 26') and second (28, 28') legs of said second plurality (30) of laminations for reinforcing the flux in the axially aligned first legs (26, 26') while opposing the flux in the other axially aligned second leg (28, 28') of said second plurality (30) of laminations, and vice versa, depending upon the direction of electrical current flow in said first winding means (38), and second winding means (40) looped between said first (26, 26') and second (28, 28') legs of said third plurality (32) of laminations for reinforcing the flux in axially aligned first legs (26, 26') while opposing the flux in the other axially aligned second legs (28, 28') of said third plurality (32) of laminations and looped between said first (26, 26') and second (28, 28') legs of said fourth plurality (34) of laminations for reinforcing the flux in the axially aligned first legs (26, 26') while opposing the flux in the other axially aligned second legs (28, 28') of said fourth plurality (34) of laminations, and vice versa, depending upon the direction of electrical current flow in said second winding means (40) so that when said first (24) and second (30) plurality of laminations are axially aligned with and transversely overlying said magnetic zones (12) and said third (32) and fourth (34) plurality of laminations are axially offset $p(n\pm\frac{1}{4})$ and transversely overlapping said magnetic (12) and nonmagnetic (14) zones, said long legs (28) of said second legs (28, 28') of each of said third (32) and fourth (34) plurality of laminations coact with the underlying magnetic zones (12) in response to current flow in said second winding means (40) in loop direction one (clockwise) to move said head (22) axially in one direction and said long legs (26') of said first legs (26, 26') of each of said third (32) and fourth (34) plurality of laminations coact with the underlying magnetic zones (12) in response to current flow in said second winding means (40) in loop direction two (counterclockwise opposite to direction one to move said head (22) axially in the opposite direction at which position current flow in said first winding means (38) in loop direction one causes said long legs (26') of said first legs (26, 26') of each of said first (24) and second (30) plurality of laminations to coact with the underlying magnetic zones (12) to move said head (22) axially in one direction or alternatively current flow in said first winding means (38) in loop direction two opposite to direction one causes said long legs (28) of said second legs (28, 28') of each of said first (24) and second (30) plurality of laminations to coact with the underlying magnetic zones (12) to move said head (22) axially in the opposite direction.

2. An assembly as set forth in claim 1 wherein each of said laminations includes a T-shaped top (42) with said first (26, 26') and second (28, 28') legs depending therefrom.

3. An assembly as set forth in claim 2 wherein said head (22) includes a housing means (44) permanent magnets (36, 36'), and clamping means (46, 48, 50, 52) engaging the bottoms of said T-shaped tops (42) to clamp said laminations and said magnets to said housing means.

4. An assembly as set forth in claim 3 wherein said permanent magnetic (36) extends between the tops (42) of said first (24) and second (30) plurality of laminations and the other permanent magnet (36') extends between said tops of said third (32) and fourth (34) plurality of laminations.

5. An assembly as set forth in claim 4 wherein said head (22) includes air passages (60, 62) therein to establish an air cushion between said head (22) and said platen (12, 14).

6. An assembly as set forth in claim 1 wherein said magnetic (12) and nonmagnetic (14) zones of said platen are defined by laminations, each having a thickness in the direction of axial movement of said head of ½ p with alternate laminations being of magnetic material (12) so that magnetic lines of flux act along said magnetic laminations transversely between said first (24) and second (30) pluralities of laminations and transversely between said third (32) and fourth (34) pluralities of laminations.

7. An assembly as set forth in claim 6 wherein each of said magnetic laminations (12) are magnetically isolated from each other by said nonmagnetic laminations (14).

8. An assembly as set forth in claim 1 wherein all of said laminations are identical.

9. An assembly as set forth in claim 1 wherein said pluralities of laminations are identical to one another.

* * * * *